UNITED STATES PATENT OFFICE 2,373,375

PLASTICIZED RUBBER AND METHOD OF MAKING

Edward S. Blake, Nitro, W. Va., assignor to Monsanto Chemical Company, St. Louis, Mo., a corporation of Delaware No Drawing. Application November 28, 1941, Serial No. 420,841

10 Claims. (Cl. 260—761)

This invention relates to improvements in the treatment of rubber and more particularly to a method of increasing the plasticity of rubber and to the plasticized rubber compositions obtained thereby.

In the manufacture of rubber articles it is necessary to decrease the resistance of the rubber to flow in order to facilitate the incorporation of compounding and vulcanizing ingredients as well as to provide a rubber composition which is amenable to shaping into the form of the finished article. While mechanical mastication alone may be resorted to for the plasticization of rubber, this is a time consuming operation and results in a permanent break down of the rubber. Accordingly, it is common practice to add to the rubber, during the milling or equivalent operation, a material which assists in decreasing the resistance of the rubber to flow.

It is an object of this invention to provide a class of materials which, when added to rubber, will materially increase its rate of plasticization during mastication. A further object of this invention is to achieve a saving of time and power over that which would be consumed in the absence of the preferred class of materials. A still further object is to facilitate the production of vulcanized rubber articles. Other objects are to provide new compositions of matter and to provide a softened rubber of desirable physical properties. Still other objects will be apparent from the description following.

In accordance with this invention rubber is subjected to the action of a compound having the formula

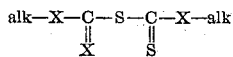

where X is sulfur or oxygen and alk represents an organic radical having an alkyl carbon atom linked to X. Typical examples of alk comprise allyl, methyl, ethyl, propyl, butyl, amyl, hexyl, lauryl, cyclohexyl and benzyl radicals but it is to be understood that the invention is not limited thereto.

While neither sulfur nor compounding ingredients materially affect the softening action of the preferred compounds it is necessary to leave out one component required for proper vulcanization in order to prevent pre-vulcanization since considerable heat is built up during the initial plasticization of rubber. Accordingly the rubber in the absence of either sulfur or accelerator, is subjected to the action of the preferred class of materials for a time and temperature sufficient to markedly increase the plasticity of the rubber over that which it would have if subjected to the same conditions in the absence of the plasticizing agent. It is understood that the temperature referred to is simply that resulting from the heat build-up during mastication of the rubber. This heat materially hastens the action of the softeners. However, the application of the compounds to rubber may be varied in many ways and under some conditions lower temperatures and longer times are more convenient. For example, a rubber cement may be prepared and the plasticizing agent added to the cement. Preferably, the action is hastened by the application of heat. Alternatively, the plasticizing agent may be added to the rubber before preparation of the cement. In addition the new plasticizing agents may be added to the latex before coagulation.

The new and preferred plasticizing agents may be called thio anhydrides of thiol carbonic acids. Both symmetrical and mixed anhydrides can be used. Since many of the new agents are well known chemicals they can be prepared by methods disclosed in the literature or by methods closely analogous thereto. For example, the thio anhydrides of the xanthic acids can be prepared by treating an alkali metal xanthate with phosgene (Willcox, Jour. Am. Chem. Soc. 28, 1031–34). Similarly, the thio anhydrides of alkyl tri-thio carbonic acids can be prepared by treating an alkali metal salt of the alkyl tri-thio carbonic acid with phosgene. The former may be prepared by treating an alkyl mercaptan with an aqueous solution of an alkali metal hydroxide and with carbon disulfide as described in U. S. Patent 2,152,461 granted to William T. Bishop.

Various mixed thio anhydrides can be prepared by treating an alkali metal xanthate or alkali metal tri-thio carbonate with an alkyl chlor formate or an alkyl thio chlor formate. However, the invention is not concerned with the preparation of the chemicals and is not limited thereto. While the foregoing illustrate means by which the preferred materials can be prepared, other methods may be used where desired.

The following examples illustrate in detail the preparation of the preferred class of materials.

*Example I*

Substantially 693 parts by weight of potassium ethyl xanthate was dissolved in a suitable solvent as for example substantially 1740 parts by weight of carbon tetrachloride. The mixture was cooled below 10° C. and substantially 200 parts by weight of phosgene run in while keeping the mixture cold. The charge was below 5° C. during the greater part of the addition. The solvent was removed, conveniently by distillation, the residue washed with water and dried in the air. A good yield of ethyl xanthic acid thio anhydride was obtained.

Other compounds useful for the plasticization of rubber may be prepared by replacing the potassium ethyl xanthate with other xanthates in the procedure described above. For example methyl xanthic acid thio anhydride was prepared from potassium methyl xanthate and phosgene and amyl xanthic acid thio anhydride was prepared from potassium amyl xanthate and phosgene. Similarly, benzyl xanthic acid thio anhydride was prepared from potassium benzyl xanthate and phosgene.

*Example II*

Substantially 125 parts by weight of 40% aqueous caustic soda were added to 90 parts by weight of butyl mercaptan, keeping the temperature below 40° C. Substantially 450 parts by weight of carbon bisulfide were then added keeping the mixture cold. The large amount of carbon disulfide was used in order to provide a final reaction charge which could be stirred. The charge was stirred until homogeneous throughout and when the reaction was complete, the solvent was removed by distillation under vacuum and dried under a vacuum leaving 189 parts by weight of butyl sodium tri-thio carbonate. This was diluted with substantially 990 parts by weight of carbon tetrachloride and phosgene run in until substantially 50.5 parts by weight had been absorbed. The reaction mixture was allowed to stand for a day or so at room temperature and the solvent removed by distillation. The residue was suspended in water and then taken up in ether and dried. The solvent was removed from the dry extracts and the residue heated up to 80° C. at 2 to 4 mm. pressure. A good yield of oily product believed to be butyl tri-thio carbonic acid thio anhydride was obtained.

The ethyl analogue was prepared in similar manner. Substantially 193 parts by weight of ethyl potassium tri-thio carbonate was obtained from an initial charge of 75 parts ethyl mercaptan, 170 parts of 40% KOH and 91.5 parts of carbon disulfide (all parts are by weight). The tri-thio carbonate was taken up in 2570 parts by weight of carbon tetrachloride and 50 parts by weight of phosgene run in while keeping the temperature below 6° C. The charge was allowed to stand for about two days and the product worked up as described above. A good yield of a product believed to be ethyl tri-thio carbonic acid thio anhydride was obtained.

The following specific embodiments of the invention illustrate the desirable properties of the new softening or plasticizing agents and are not to be taken as limitative of the invention.

A quantity of a rubber-carbon black master batch compound of sixty parts smoked sheets of rubber and forty parts of carbon black was milled for a short time to assure uniformity and then smoked sheets of rubber, compounding and vulcanizing ingredients (except sulfur) were added in such amount as to produce rubber stocks of the composition shown below. In order to assure reproducible results the same temperature and time of milling was employed in the preparation of each stock. Thus, the milling time was nine minutes and the mill rolls were maintained at a temperature of 100° C. In this manner, a rubber base stock was compounded comprising

| Base stock, parts by weight | |
|---|---|
| Smoker sheets of rubber | 100 |
| Carbon black | 50 |
| Zinc oxide | 5 |
| Laurex | 2 |
| Condensation product p-amino diphenyl and acetone | 1.5 |
| Mercaptobenzothiazole | 0.75 |

Rubber stocks were prepared from the base stock by adding the ingredients shown below:

| Stock | Ingredient added to base stock | Parts by weight |
|---|---|---|
| A | Butyl tri-thio carbonic acid thio anhydride | 0.15 |
| B | Ethyl tri-thio carbonic acid thio anhydride | 0.15 |
| C | Allyl xanthic acid thio anhydride | 0.15 |
| D | Benzyl xanthic acid thio anhydride | 0.15 |
| E | Ethyl xanthic acid thio anhydride | 0.15 |
| F | Methyl xanthic acid thio anhydride | 0.15 |
| G | Mixed thio anhydride of ethyl carbonic acid and ethyl xanthic acid | 0.15 |

At the end of the milling period the stocks so compounded were sheeted out and allowed to stand until they had cooled to room temperature. The sheets were then folded back upon themselves to build up a thickness sufficient to cut test pellets and test pellets cut out by means of a suitable die. The plasticity or resistance of the pellets to flow was measured by means of an extrusion plastometer. A description of the method and apparatus is given by J. H. Dillon in Rubber Chemistry and Technology, volume 9, (1936) pages 496–501. The quantity measured was the time in seconds required to extrude a given volume of rubber at constant temperature and under a constant pressure. In the particular tests herein described the temperature of the plastometer and test pellet was within the range of 82° to 85° C. The pressure on the plunger was 5.5 pounds per square inch although other pressures can be used where desired. The test pellets were cut out immediately prior to test which was usually the day after milling although occasionally two days elapsed. Since this makes a slight difference in the figures obtained the figures given in the table below are ratios based upon the control or base stock as 100 when run on the same day and under exactly the same conditions. In other words, the percentage plasticity based on the untreated stock was calculated from the actual readings in seconds. Thus, a figure 70 means that a given volume of the stock extruded in 70% of the time required to extrude the same volume of stock in the absence of the preferred materials.

| Stock | Plasticity figure |
|---|---|
| A | 70.5 |
| B | 70.1 |
| C | 72.5 |
| D | 79.3 |
| E | 70.7 |
| F | 61.5 |
| G | 70.0 |
| Base stock | 100.0 |

These results illustrate the desirable softening properties of the preferred class of materials and show that they are effective in the presence of compounding ingredients.

Other stocks were compounded comprising

|  | Stock | | |
| --- | --- | --- | --- |
|  | Base stock #2 | H | J |
| Smoked sheets of rubber | 100 | 100 | 100 |
| Sulfur |  | 3 | 3 |
| Ethyl xanthic acid thio anhydride |  |  | 0.25 |

The plasticity figures determined as described above are set forth below:

| Stock | Plasticity figure |
| --- | --- |
| H | 95.0 |
| J | 69.2 |
| Base stock #2 | 100.0 |

These results show that the new softening agents are substantially unaffected by sulfur.

While the specific embodiments furnished to illustrate the invention disclose the addition of the plasticizing agent to the rubber on an ordinary rubber mill, other types of apparatus may be used as for example, a Banbury type mixer or a Gordon plasticator.

Again, the invention is not limited to the specific embodiments in the invention. The preferred materials may be employed in different proportions than specifically shown and in conjunction with other compounding and vulcanizing ingredients. Obviously, many variations can be made without departing from the spirit of the present invention. This invention is limited solely by the claims attached hereto as part of the present specification.

What is claimed is:

1. The method of increasing the plasticity of unvulcanized rubber which comprises subjecting the unvulcanized rubber in the absence of sulfur to the action of a compound having the formula

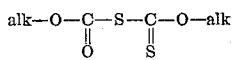

where X is selected from a group consisting of sulfur and oxygen and alk represents an organic radical having an alkyl carbon atom linked to X and heating for a time and temperature to effect a marked increase in plasticity over that which the rubber would have if subjected to the same conditions in the absence of said compound, the amount of said compound being at least about 0.15 part by weight but not more than about 0.25 part by weight per 100 parts by weight of rubber.

2. The method of increasing the plasticity of unvulcanized rubber which comprises subjecting the unvulcanized rubber in hte absence of sulfur to the action of a compound having the formula

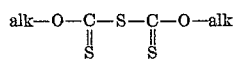

where alk represents an organic radical having an alkyl carbon atom linked to the oxygen and heating for a time and temperature to effect a marked increase in plasticity over that which the rubber would have if subjected to the same conditions in the absence of said compound, the amount of said compound being at least about 0.15 part by weight but not more than about 0.25 part by weight per 100 parts by weight of rubber.

3. The method of increasing the plasicity of unvulcanized rubber which comprises subjecting the unvulcanized rubber in the absence of sulfur to the action of a compound having the formula

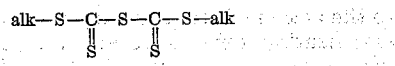

where alk represents an organic radical having an alkyl carbon atom linked to the sulfur and heating for a time and temperature to effect a marked increase in plasticity over that which the rubber would have if subjected to the same conditions in the absence of said compound, the amount of said compound being at least about 0.15 part by weight but not more than about 0.25 part by weight per 100 parts by weight of rubber.

4. The method of increasing the plasticity of unvulcanized rubber which comprises subjecting the unvulcanized rubber in the absence of sulfur to the action of a compound having the formula

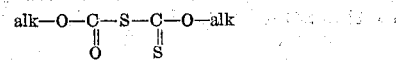

where alk represents an organic radical having an alkyl carbon atom linked to the oxygen and heating for a time and temperature to effect a marked increase in plasticity over that which the rubber would have if subjected to the same conditions in the absence of said compound, the amount of said compound being at least about 0.15 part by weight but not more than about 0.25 part by weight per 100 parts by weight of rubber.

5. The method of increasing the plasticity of unvulcanized rubber which comprises subjecting the unvulcanized rubber in the absence of sulfur to the action of a compound having the formula

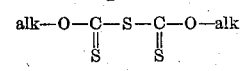

where alk represents an alkyl radical containing less than seven carbon atoms and heating for a time and temperature to effect a marked increase in plasticity over that which the rubber would have if subjected to the same conditions in the absence of said compound, the amount of said compound being at least about 0.15 part by weight but not more than about 0.25 part by weight per 100 parts by weight of rubber.

6. The method of increasing the plasticity of unvulcanized rubber which comprises subjecting the unvulcanized rubber in the absence of sulfur to the action of a thio anhydride of a thio carbonic acid, said anhydride containing at least one thio carbonyl group linked to the anhydride sulfur atom and heating for a time and temperature to effect a marked increase in plasticity over that which the rubber would have if subjected to the same conditions in the absence of said compound, the amount of said compound being at least about 0.15 part by weight but not more than about 0.25 part by weight per 100 parts by weight of rubber.

7. The method of increasing the plasticity of unvulcanized rubber which comprises subjecting the unvulcanized rubber in the absence of sulfur to the action of a thio anhydride of an alkoxy dithionic acid, said anhydride containing at least one thio carbonyl group linked to the anhydride sulfur atom, and heating for a time and temperature to effect a marked increase in plasticity over that which the rubber would have if subjected to the same conditions in the absence of said compound, the amount of said compound being at least about 0.15 part by weight but not more than about 0.25 part by weight per 100 parts by weight of rubber.

8. The method of increasing the plasticity of unvulcanized rubber which comprises subjecting the unvulcanized rubber in the absence of sulfur to the action of ethyl xanthic acid thio anhydride and heating for a time and temperature to effect a marked increase in plasticity over that which the rubber would have if subjected to the same conditions in the absence of said compound, the amount of said compound being at least about 0.15 part by weight but not more than about 0.25 part by weight per 100 parts by weight of rubber.

9. The method of increasing the plasticity of unvulcanized rubber which comprises subjecting the unvulcanized rubber in the absence of sulfur to the action of ethyl tri-thio carbonic acid thio anhydride and heating for a time and temperature to effect a marked increase in plasticity over that which the rubber would have if subjected to the same conditions in the absence of said compound, the amount of said compound being at least about 0.15 part by weight but not more than about 0.25 part by weight per 100 parts by weight of rubber.

10. The method of increasing the plasticity of unvulcanized rubber which comprises subjecting the unvulcanized rubber in the absence of sulfur to the action of the mixed thio anhydride of ethyl carbonic acid and ethyl xanthic acid and heating for a time and temperature to effect a marked increase in plasticity over that which the rubber would have if subjected to the same conditions in the absence of said compound, the amount of compound being at least about 0.15 part by weight but not more than about 0.25 part by weight per 100 parts by weight of rubber.

EDWARD S. BLAKE.

Certificate of Correction

Patent No. 2,373,375.                                                                                                April 10, 1945.

EDWARD S. BLAKE

It is hereby certified that error appears in the printed specification of the above numbered patent requiring correction as follows: Page 3, first column, lines 43 to 46 inclusive, claim 1, strike out the formula and insert instead the following—

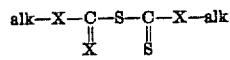

and that the said Letters Patent should be read with this correction therein that the same may conform to the record of the case in the Patent Office.

Signed and sealed this 18th day of September, A. D. 1945.

[SEAL]

LESLIE FRAZER,
*First Assistant Commissioner of Patents.*